(12) United States Patent
Diaz

(10) Patent No.: US 8,583,525 B1
(45) Date of Patent: Nov. 12, 2013

(54) BUSINESS METHOD FOR CREATING COLLATERIZED DEBT INSTRUMENTS WITH TWO NEGOTIABLE PAYMENT PLANS

(76) Inventor: Gustavo Rafael Diaz, Miami, FL (US)

( * ) Notice: Subject to any disclaimer, the term of this patent is extended or adjusted under 35 U.S.C. 154(b) by 166 days.

(21) Appl. No.: 12/880,753

(22) Filed: Sep. 13, 2010

(51) Int. Cl.
*G06Q 40/00* (2012.01)

(52) U.S. Cl.
USPC .................................. 705/35; 705/38; 705/40

(58) Field of Classification Search
USPC ................................................... 705/15–45
See application file for complete search history.

(56) References Cited

U.S. PATENT DOCUMENTS

| | | | | |
|---|---|---|---|---|
| 4,876,648 | A * | 10/1989 | Lloyd | 705/38 |
| 7,818,229 | B2 * | 10/2010 | Imrey et al. | 705/35 |
| 2003/0110111 | A1 * | 6/2003 | Nalebuff et al. | 705/35 |
| 2005/0102224 | A1 * | 5/2005 | Blanz et al. | 705/38 |
| 2008/0033766 | A1 * | 2/2008 | Troxler | 705/4 |
| 2008/0103961 | A1 * | 5/2008 | Ramani et al. | 705/38 |
| 2008/0109347 | A1 * | 5/2008 | Pilcher et al. | 705/38 |
| 2009/0024539 | A1 * | 1/2009 | Decker | 705/36 R |

OTHER PUBLICATIONS

Joshua Stein and Mathieu Streiff, "Securitization of Commercial Mortgage Loans", Jan. 17, 2006, New York Law Journal.*
"Credit Default Swap (CDS) Primer", Nomura Fixed Income Research, May 12, 2004.*

* cited by examiner

*Primary Examiner* — Hai Tran
(74) *Attorney, Agent, or Firm* — Sanchelima & Associates, P.A.

(57) ABSTRACT

A business method for creating, from a mortgage note, two negotiable collaterized debt instruments, each having a separate payment plan. The original mortgagee, or its assigns, use the method to alleviate the mortgagor's monthly payment burden thereby avoiding costly foreclosure proceedings that will result in an increase of inventory of non-performing assets. Additionally, the property values are preserved resulting in more stability. One of the resulting debt instruments with a first payment plan (non-toxic) maintains, or attempts to maintain, the original terms of the mortgage note, depending on market conditions, but reduces the monthly payments in proportion to the non-toxic to property value ratio. The toxic portion of the debt is deferred for a number of years at which time the principal and accrued interest is due. This secured payment plan is deferred. By that time the value of the property is expected to have increased. The original mortgagee, or its assigns, can then pool the debt instruments to issue binds secured by the pools.

4 Claims, 3 Drawing Sheets

BUSINESS METHOD FOR CREATING COLLATERIZED DEBT INSTRUMENTS WITH TWO NEGOTIABLE PAYMENT PLANS

BACKGROUND OF THE INVENTION

1. Field of the Invention

The present invention relates to a business method for transforming an original negotiable collaterized debt instrument into two negotiable collaterized resulting debt instruments with two payment plans, and more particularly, to such a method wherein one of the payment plans is deferred for a predetermined period of time.

2. Description of the Related Art

Several systems have been designed in the past for alleviating the financial strains of debtors, such as homeowners. However, they fail to include alternatives for the payment plans to allow modification of the terms and conditions of the loans to reflect both the borrowers' current financial condition and the value of their homes in a way that would contribute to preserve the value of the properties. Additionally, the present business method modifies the cash flow obligations of the debtor by permitting him or her to borrow on the future appreciated value of the collateral. In most instances, the present invention will help avoid foreclosure proceedings.

Applicant believes that the closest reference corresponds to U.S. Pat. No. 4,876,648 issued to Lloyd for a system and method for implementing and administering a mortgage plan. However, it differs from the present invention because Lloyd's patented system and method is based on a partial collateralization of the mortgages through interest-sensitive investments, such as universal life insurance policies owned by the lender, on the life of the borrower. The problem with the approach is that, while the lender is protected, it increases the costs to the debtor who is looking for financial relief. The present invention, on the other hand, provides immediate relief to the debtor, substantially reducing his cash flow obligations. This, in turn, avoids other problems and preserves the value of the property.

Other patents describing the closest subject matter provide for a number of more or less complicated features that fail to solve the problem in an efficient and economical way. None of these patents suggest the novel features of the present invention.

SUMMARY OF THE INVENTION

It is an object of this invention to provide a method for restructuring the cash flow obligations of a mortgagor to avoid delinquencies.

It is another object of this invention to detain or minimize the deterioration of property values and to contribute to the financial stabilization of the financial markets.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE INVENTION

Figure 1:
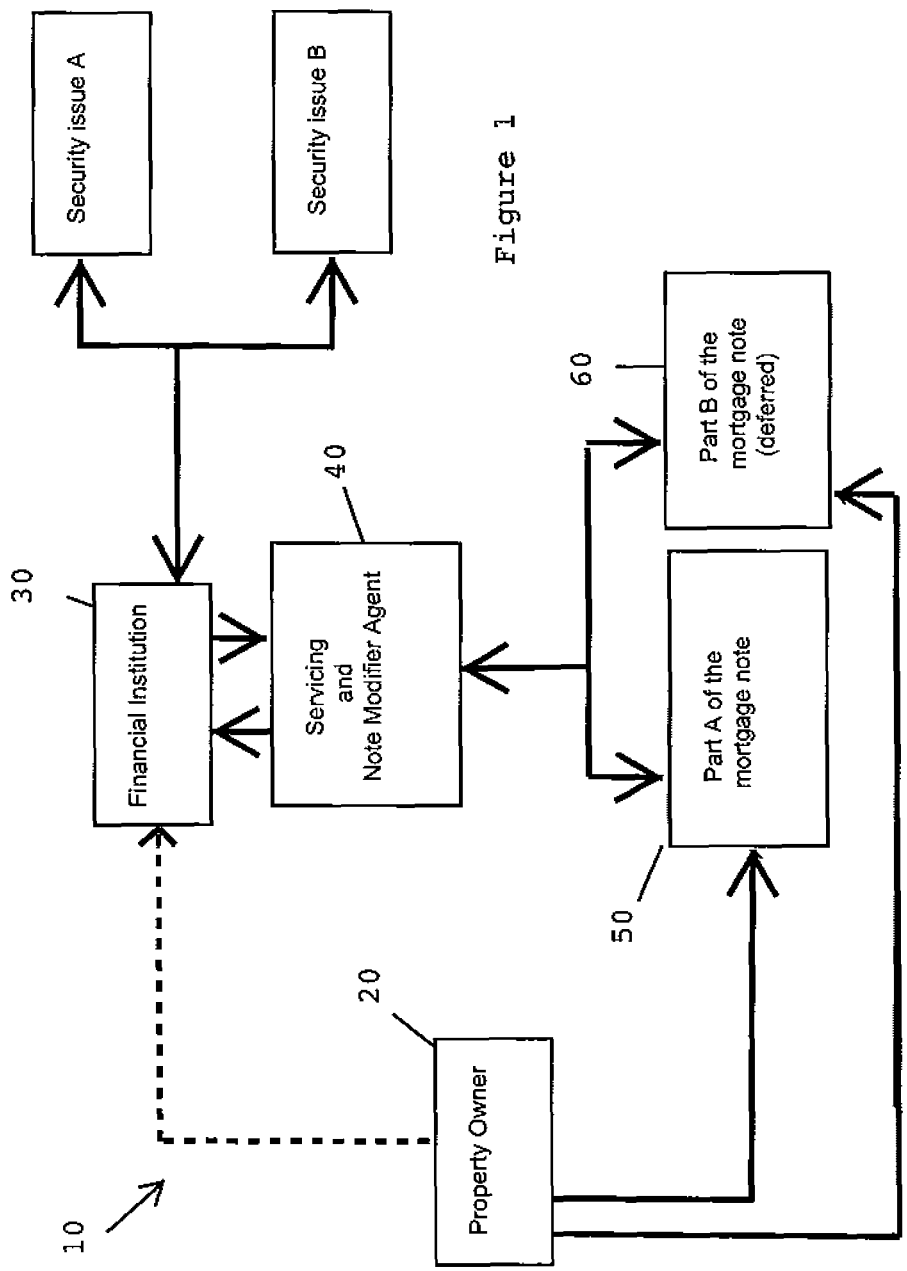
FIG. 1 represents a block diagram of one of the embodiments of the system subject of the present invention illustrating the process for transforming an original debt instrument held by a financial institution by a user or agent.

Referring now to the drawings, where the present invention is generally a business method 10 for transforming an original collaterized debt instrument with one payment plan into two negotiable collaterized resulting debt instruments with two payment plans. The method to be practiced by a user, as shown in FIG. 1, includes the steps of:

A) Creating a network of interconnected computerized financial institution users 30, each user 30 including a plurality of original mortgage notes in a computerized database identifying their respective mortgage notes, note payment terms, outstanding balances, collateral property values, and other information pertaining to the collateral and/or solvency of the mortgagor and/or payment history.

B) Ascertaining for each mortgage note the differences between the collateral property values and the outstanding note balances, thereby calculating the toxic portion, if any, of each of said mortgage notes. By toxic portion will be understood the difference between the value of the collateral and note balance when the latter is higher. The non-toxic portion is the mortgage note balance less the toxic portion. This can be accomplished with a servicing and management agent 40 either as an outside independent operation or as part of financial institution user 30.

C) Generating two debt documents or instruments 50; 60 (part A and part B) for selected original mortgage notes, transforming the payment terms and note balances of each of the original mortgage note into two payment plans. The first instrument maintains the original terms and obligations of the mortgagor for the non-toxic portion of the mortgage note. As an average, mortgage note assets in financial institutions have shown that the value of the collateral is around 60% of the current value of the mortgage note balance. This means that the monthly payment obligations will be reduced proportionately to approach the monthly payment obligation of the real value of the collateral 5 property around 60% of the monthly payment obligation. The second payment plan is securitized in an instrument that defers the toxic portion (typically around 40% of the payment obligations of the notes' balances) for a predetermined period of time. The second instrument will behave like a zero coupon wherein investors pay a price that may be discounted from the nominal amount of the instrument. The second instrument will also have the collateral protection. The property owner will, of course, need to signify his or her consent to the new payment plans. A computerized database keeps track of the mortgagor's payment performance under both payment plans. If there is a non-performance event with any one of the terms of either one of the payment plans, an alarm or information is stored in the database for the other payment plan. By non-performance event, it will be understood as any event that is contrary to the note terms, including failure to pay on time, failure to maintain the property insured, or equivalent. The resulting first and second debt instruments 50; 60 are related to the collateral through a computer with a computerized database. This 60% in this example corresponds to the non-toxic portion of the mortgage obligation.

D) Servicing the first and second debt instruments over the periods of both payment plans. For the purposes of this application, the terms "toxic portion" and "non-toxic portion" refer to the portions in a mortgage note obligation that are above the collateral property value and below it, respectively. For example, if a mortgage note has an outstanding balance of $100,000.00 and the collateral property is valued at $60,000.00, the toxic portion corresponds to $40,000.00 and the complementing non-toxic portion us $60,000.00.

E) Optionally, as seen in FIG. 4, the second debt instrument is used to create security collateral for the issuance of derivative instruments such as secured debentures or similar security instruments for additional generation of cash.

To the foregoing method steps, other steps can be added such as insuring the instruments with predetermined terms, including deductibles, which will take into consideration the particulars of the mortgagors. These additional steps are intended to reduce the risk of the investment and thus enhance the value of the second instrument.

The particulars as to the interest rates of the original mortgage notes and what the user is willing to offer will vary depending on market conditions. The present method, however, will provide the means to a mortgagor for avoiding losing his/her property and will also help the mortgagee going through costly litigation that will result in increasing its inventory of foreclosed properties. Another advantage of utilizing this method is that it preserves the value of the collateral properties by keeping more homeowners in their properties.

The scenario shown in FIG. 1 illustrates several possibilities for the financial institution that owns the rights to the original mortgage note. Also, what applies to one financial institution 30 applies to a network of several financial institutions. First, it can use an agent 40 for servicing and managing its assets (the mortgage note). The property owner 20 will then stop making payments to the financial institution 30 (broken lines) and starts making payments to the agent 40. One of the payments will continue to be monthly (for part A), as he or she made those payments with the financial institution 30 before. The other payment is a deferred lump sum (part B). Financial institution 30 optionally issues security A, which is a debenture bond secured by Part A of mortgage note 50. And financial institution 30 optionally issues security B, which is a debenture bond secured by Part B of mortgage note 60. In this manner, financial institution 30 can obtain present capitalization.

Figure 2:
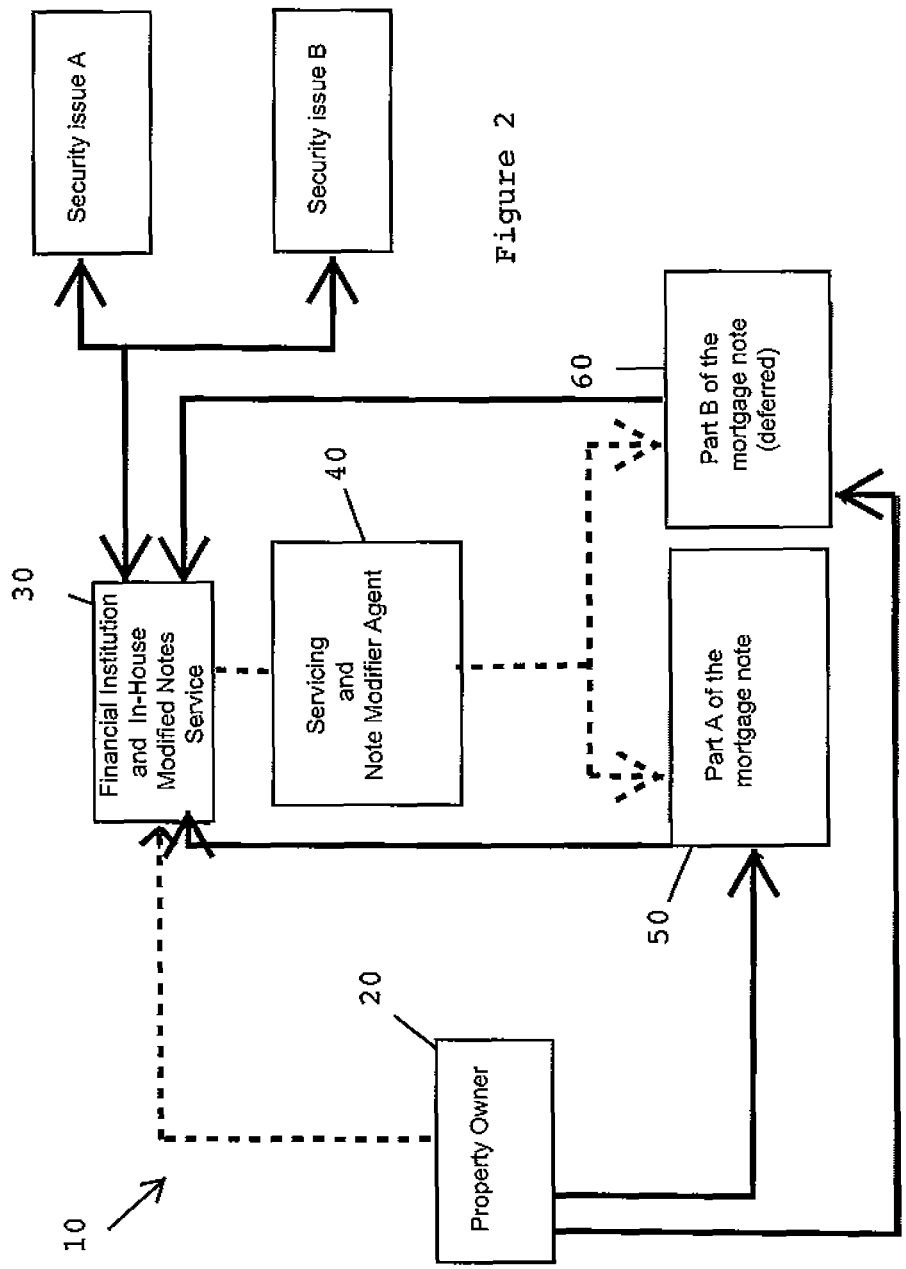
FIG. 2 is similar to FIG. 1 except that the financial institution to undertake the tasks of servicing the modified notes is in-house.

Another possibility is for the financial institution to undertake the tasks of servicing the modified notes in-house as shown in FIG. 2. This will result in a seamless operation with minimum changes to the property owner. The broken lines show that note modifier agent 40 is removed after it divides the mortgage note into parts A and B. Agent 40 does not service the notes or is in any way involved after its initial participation.

Figure 3:
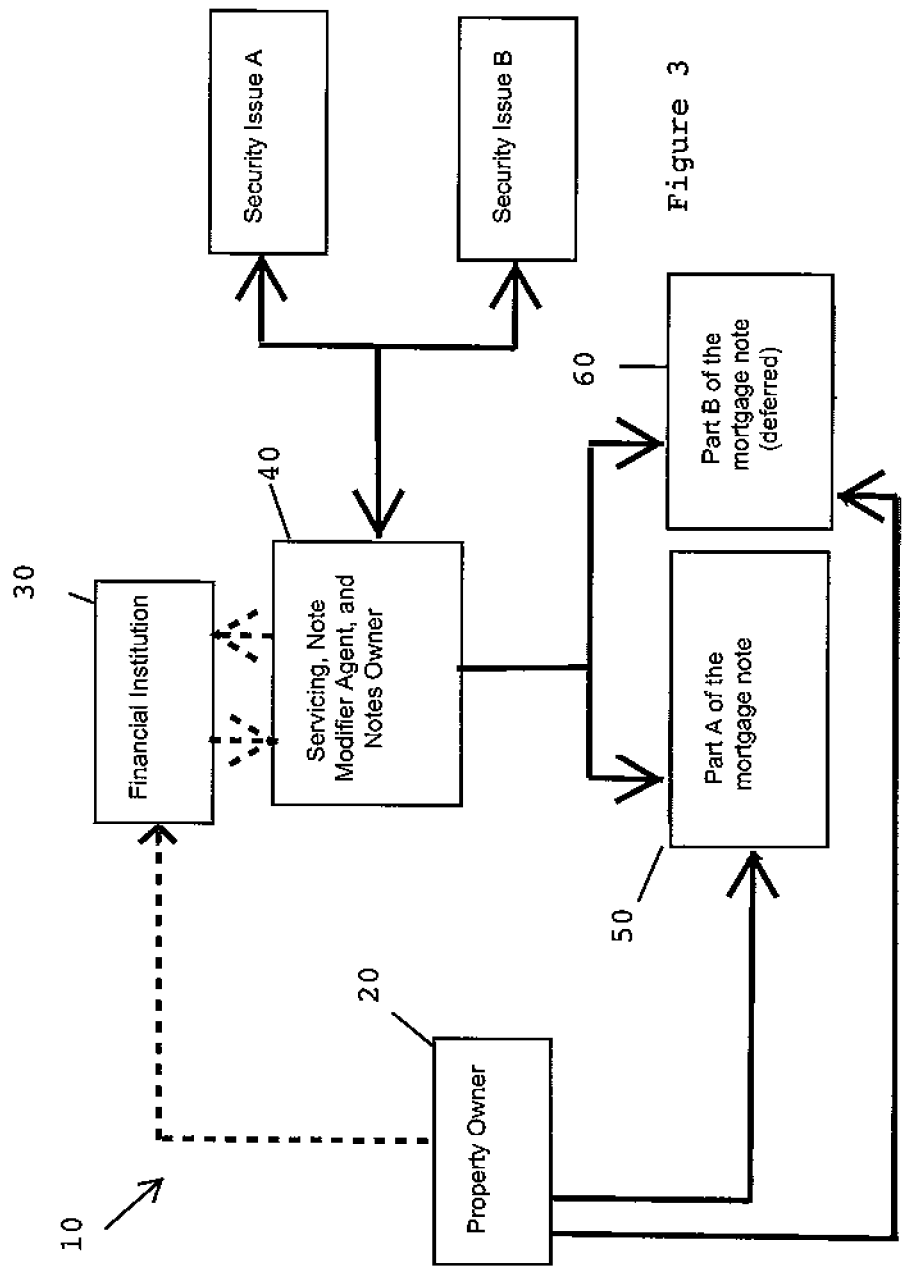
FIG. 3 is also similar to FIG. 1 except that the outright sale of the original mortgage note is to agent 40 who will also undertake the transformation of the debt instrument and service it. The broken lines represent the discontinued payments from property owner 20 to financial institution 30.

Yet another possibility is the outright sale of the original mortgage note to agent 40 who will also undertake the transformation of the debt instrument and service it, as illustrated in FIG. 3. Agent 40 can then keep the resulting two debt instruments or sell them to a third party and may continue servicing them. The broken lines represent the discontinued payments from property owner 20 to financial institution 30. And after financial institution 30 is paid, there are no other payments due. Agent 40 services its own assets.

Under any one of the above mentioned scenarios, the resulting two debt instruments are collaterized and provide a continuous cash flow, albeit reduced, to the mortgagee, or its assignees, and the toxic portion debt is deferred in an asset that can be pooled with similar ones to create a collateral for derivative instruments such as secured debentures. The raising of capital from the sale of the secured debentures will help meeting the cash flow obligations to other investors depending on the leverage utilized by the original mortgagee, or its assigns.

With a pool of the part A notes, a financial institution 30, or owner of the notes, can issue debentures identified as security issue A, as seen in the drawings. To create the debentures identified as security issue B, the part B notes are pooled together. A percentage of part B notes are securitized; typically, less than 50% of the total value. Such a pool includes the issuance of secured part B debentures or bonds. The debentures are sold through security brokers to security A and security B investors.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A business method for creating collaterized debt instruments with two negotiable payment plans, comprising the steps of:

A) creating a network with computerized users connected to said network and having each at least one computer and a database with a plurality of records for a corresponding plurality of mortgage notes including the particulars of the collateral property mortgagees, mortgagors, note payment terms, each of said computers being programed to calculate the remaining life of the note, outstanding note balances, and respective collateral property values;

B) ascertaining the differences between the collateral property values and the outstanding note balances to calculate by said computers a toxic portion for each of said mortgage note records and a complementing non-toxic portion, said toxic portion corresponding to the difference between the value of the collateral property and the note balance and said non-toxic portion corresponding to the difference between said note balances and the toxic portion;

C) converting said payment terms by one of said computers and note balances into first and second payment plans with their respective first and second debt instruments and storing said information in computerized database records that relate said first and second debt instruments by said one of said computers to monitor compliance with said first and second payment plans, said first payment plan maintaining said note payment terms for said non-toxic portion of each of said mortgage notes in a first collaterized debt instrument over their respective remaining lives, and said second payment plan transforming the toxic portion of said mortgage notes into a securitized second collaterized debt instrument including a deferred interest and principal payment as a balloon payment for said complementing toxic portion at the end of a predetermined time period; and D) securitizing said payment plans to issue securities collaterized by said second payment plans.

2. The business method set forth in claim 1 further including the step of:
   E) creating first and second pools of said first and second collaterized debt instruments to create respective first and second bonds secured by said first and second pools.

3. The business method set forth in claim 2 further including the step of:
   F) creating a market for said first and second bonds through a plurality of security brokers.

4. The business method set forth in claim 3 wherein said computerized database records are updated by said one of said computers with any non-performance events affecting said collateral property associated with any one of said first and second debt instruments.

\* \* \* \* \*